United States Patent [19]

Lipton et al.

[11] Patent Number: 4,967,268
[45] Date of Patent: Oct. 30, 1990

[54] LIQUID CRYSTAL SHUTTER SYSTEM FOR STEREOSCOPIC AND OTHER APPLICATIONS

[75] Inventors: Lenny Lipton, Greenbrae; Marvin Ackerman, Sunnyvale, both of Calif.

[73] Assignee: StereoGraphics, San Rafael, Calif.

[21] Appl. No.: 387,622

[22] Filed: Jul. 31, 1989

[51] Int. Cl.⁵ .............................................. H04N 13/04
[52] U.S. Cl. ...................................... 358/92; 358/149; 455/603
[58] Field of Search .......................... 358/88, 92, 149; 455/603, 617

[56] References Cited

U.S. PATENT DOCUMENTS

| | | | |
|---|---|---|---|
| 4,424,529 | 1/1984 | Roese | 358/92 |
| 4,583,117 | 4/1986 | Lipton | 358/92 |
| 4,698,668 | 10/1987 | Milgram | 358/92 |
| 4,736,246 | 4/1988 | Nishikawa | 358/92 |
| 4,772,943 | 9/1988 | Nakagawa | 358/92 |
| 4,772,944 | 9/1988 | Yoshimura | 358/92 |
| 4,786,966 | 11/1988 | Hanson | 455/617 |
| 4,792,850 | 12/1988 | Lipton et al. | 358/92 |

Primary Examiner—Howard W. Britton
Attorney, Agent, or Firm—Limbach, Limbach & Sutton

[57] ABSTRACT

A liquid crystal shutter system for selecting fields of a field-sequential image, by transmitting the field-sequential image, with a synchronization signal, to one or more remote liquid crystal cell shutter assemblies. Each shutter assembly transmits selected fields of the field-sequential image in response to a drive signal, and includes a drive circuit for receiving the synchronization signal and generating each drive signal in response to the synchronization signal so that each drive signal has transitions synchronized with image fields. The drive circuit is capable of rapidly processing short duration synchronization signals with very low power consumption. In one embodiment, two liquid crystal cell assemblies are mounted in an eyeglass frame and used as a wireless selection device for a field-sequential stereoscopic image. Preferably, the invention includes a synchronization signal receiver having a narrow angular reception range so that the receiver is sensitive to only one synchronization signal at a time, so that the invention may be employed to view several monitors without interference between different synchronization signals from the different monitors. Preferably, the inventive shutter assemblies are capable of operating in a nonoccluding state, and each inventive shutter assembly may conveniently be switched between a state suitable for stereoscopic viewing and a non-occluding state suitable for viewing a non-stereoscopic image.

27 Claims, 17 Drawing Sheets

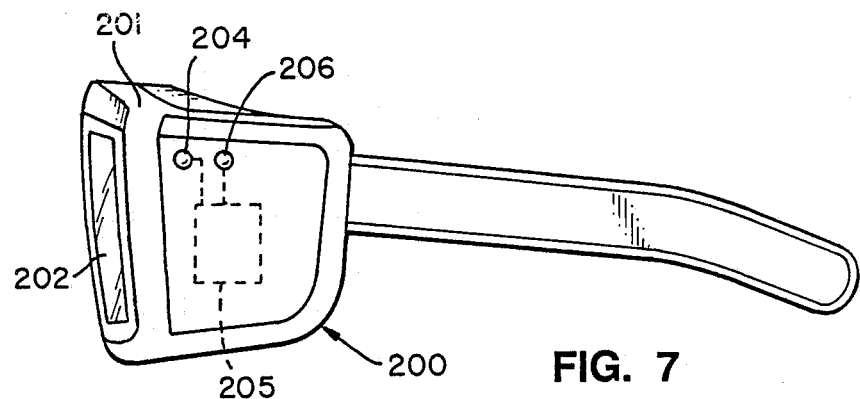
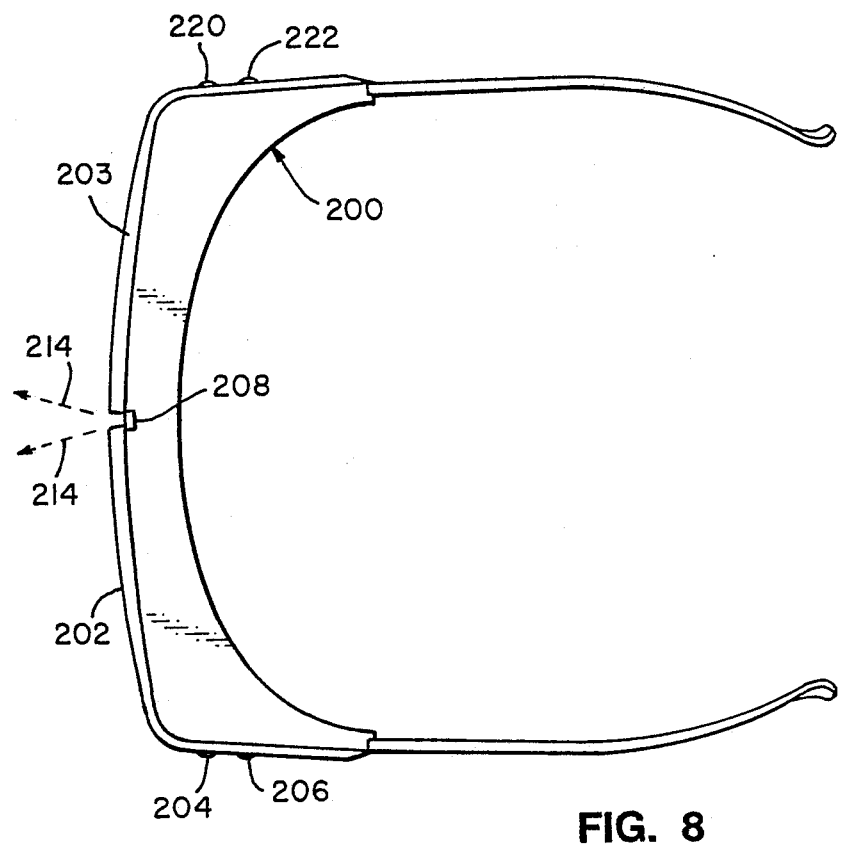
FIG. 7
FIG. 8

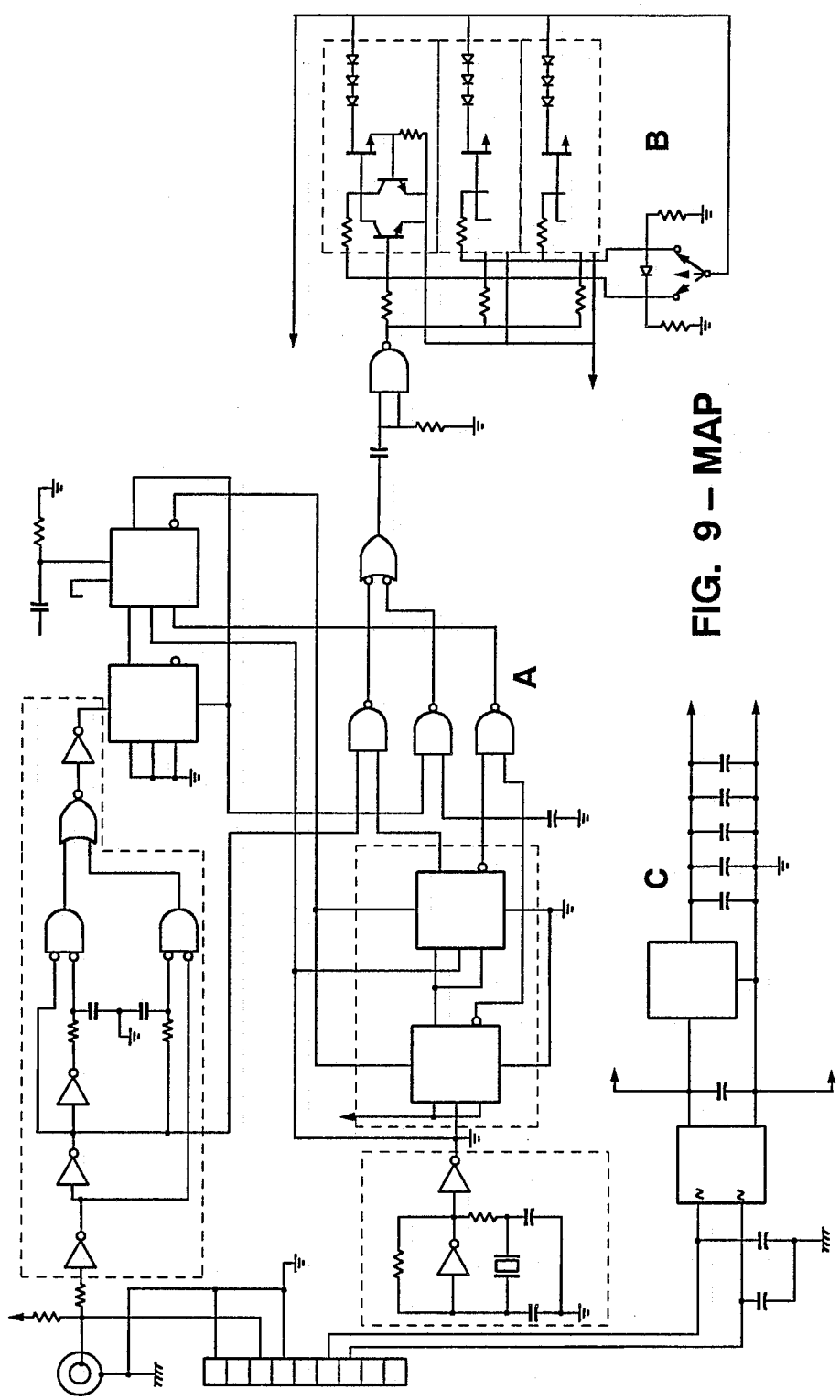
FIG. 9 – MAP

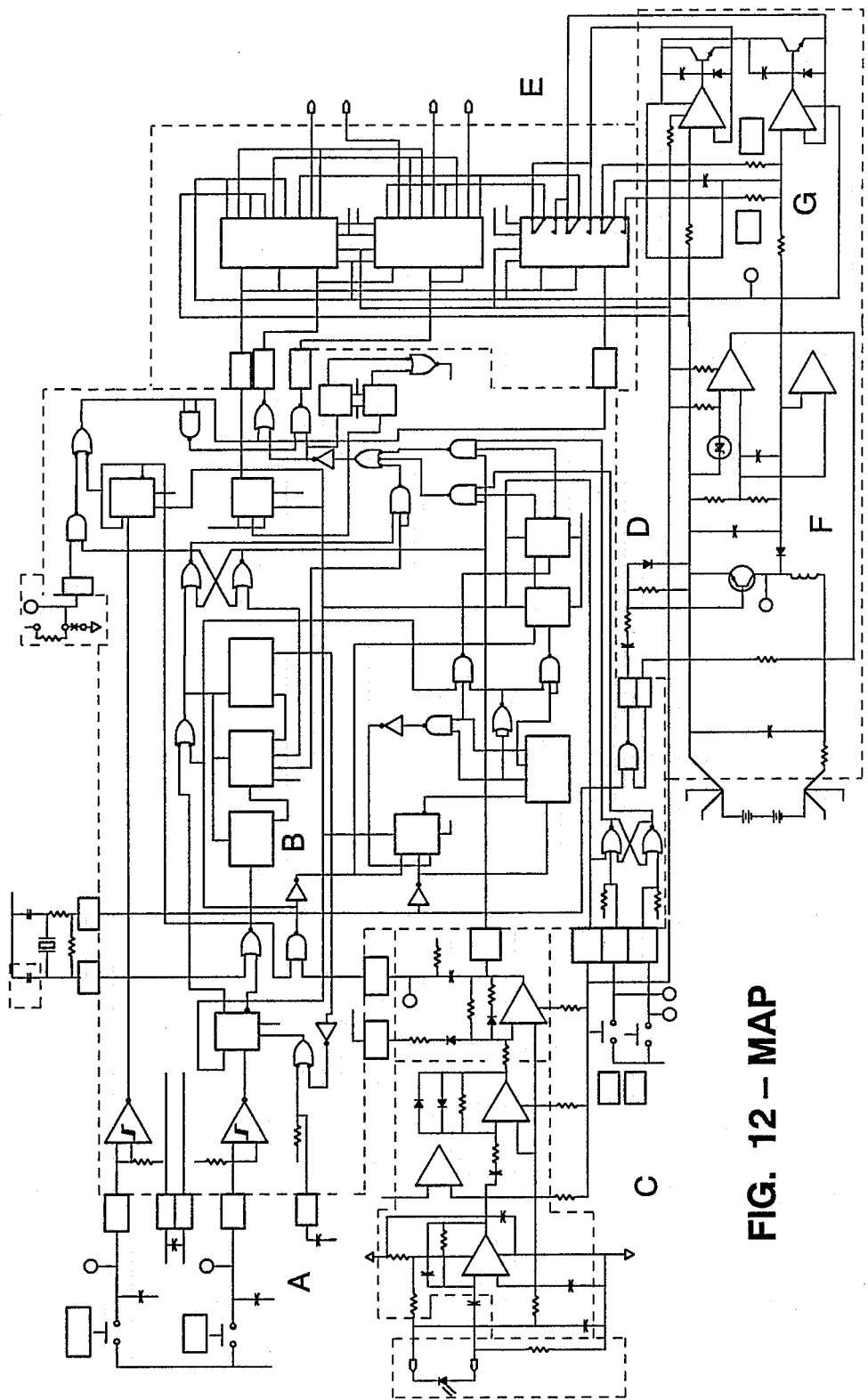
FIG. 12 – MAP

LIQUID CRYSTAL SHUTTER SYSTEM FOR STEREOSCOPIC AND OTHER APPLICATIONS

FIELD OF THE INVENTION

The invention is a liquid crystal shutter system for selecting fields of a field-sequential stereoscopic image, and a corresponding pulse width encoded synchronization signal to a liquid crystal shutter assembly, generating a drive signal in response to the transmitted synchronization signal, and supplying the drive signal to the liquid crystal shutter assembly to select fields of the transmitted image.

BACKGROUND OF THE INVENTION

Conventional plano-stereoscopic display systems produce the depth sense, stereopsis, by presenting appropriate left and right planar images to each respective eye of an observer. For the observer to be able to fuse these two planar images into a single stereoscopic view, the image for one eye must be isolated from the other. If the left eye, for example, also sees all or a portion of the intensity of the right image, there will be a perceived doubling of the image or "ghosting."

In the stereoscopic display system described in U.S. patent application Ser. No. 267,699 (filed Nov. 2, 1988, by L. Lipton, et al.), a field-sequential stereoscopic image is displayed by a monitor. The displayed image is viewed through a pair of liquid crystal shutter assemblies mounted as lenses in an eyeglass frame. By driving the two liquid crystal shutter assemblies 180 degrees out of phase, consecutive image fields are transmitted alternately to each eye. An infrared (IR) transmitter is mounted at the monitor, and an IR receiver is mounted in the frame of the eyewear for receiving an IR synchronization signal broadcast (or transmitted in another manner, such as by radio) from the transmitter. The synchronization signal is supplied from the receiver to a drive circuit for use in generating synchronized drive signals for the liquid crystal shutter assemblies, to switch the liquid crystal shutter assemblies in synchronization with the field rate of the displayed field-sequential image.

With appropriate carrier-less drive signals, very little power is required for driving the liquid crystal shutter elements, so that the drive circuit (and a power supply for the liquid crystal shutter elements and IR receiver) may be embodied in a small battery incorporated within the frame of the eyewear. The power reduction resulting from use of carrier-less driving signals enables use of small, light-weight batteries and allows a user to run the eyewear for a long period of time without replacement or recharging of batteries.

Conventional liquid crystal cells, which may be included in the described stereoscopic system, include a layer of liquid crystal material sandwiched between two flat and parallel glass sheets, coated with substrates on their inside facing surfaces. These substrates are thin, transparent, electrically conductive layers such as indium tin oxide. It is through this layer that an electric field is applied to the liquid crystal material. Another thin coating called an alignment layer is deposited on top of the conductive layer. The alignment layer imposes a preferred orientation on the liquid crystal molecules. Such an orientation is necessary for the shutter to exhibit the desired electro-optic effect. One way in which this orientation effect can be accomplished is to rub the alignment layer with a special material. The rubbing direction on one substrate is parallel (or anti-parallel) to the rubbing direction on the other substrate, as taught by Fergason in U.S. Pat. No. 4,385,806.

Such a surface mode liquid crystal cell is a capacitor and can be charged to a high or low electric potential. A surface mode cell may be switched at high speed because only a thin layer of liquid crystal molecules near the substrate actually moves as the electric potential is switched.

The liquid crystal material is in a retardation state when at a low electrical potential, and is in an isotropic state when at a high electrical potential. In the low potential state, the molecules near the surface maintain the alignment imposed on them by rubbing of the director alignment layer, and when in the high potential state, the molecules become aligned parallel to the electric field and are therefore isotropic rather than anisotropic. A typical high potential state is between 25 to 50 volts peak to peak, and a typical low potential state is between 0 to 10 volts peak to peak. By using different voltage settings for the low potential, one can tune the retardation of the liquid crystal cell. Generally speaking, the high voltage state determines how quickly and completely the cell will "turn on," and the low potential state determines the value of retardation. By adjusting the voltages it is possible to vary the dynamic range of the shutter continuously.

SUMMARY OF THE INVENTION

The invention is an improved liquid crystal shutter system for selecting fields (occurring at a field rate) of a field-sequential image. Each liquid crystal cell shutter assembly transmits selected fields of the field-sequential image to a viewer, in response to a drive signal. A drive circuit receives the synchronization signal, generates the drive signals in response to the synchronization signal (so that each drive signal will have transitions synchronized with fields of the image), and supplies a drive signal to each liquid crystal cell assembly. Preferably, each drive signal is a carrier-less voltage signal that has time-averaged voltage substantially equal to zero. The drive circuit includes means for rapidly processing short duration synchronization signals with very low power consumption.

In one important embodiment of the invention, two liquid crystal cell assemblies are mounted in an eyeglass frame and used as a wireless/active selection device for a field-sequential stereoscopic image. In response to synchronization pulses broadcast (preferably in the IR wavelength band) from a stereoscopic image source, the liquid crystal cell assemblies are driven at the field rate (one assembly substantially 180 degrees out of phase with respect to the other) in synchronization with the stereoscopic image.

The angular reception range (cone of view) of the synchronization signal receiver at the eyewear is sufficiently narrow that the receiver will be directionally sensitive. Thus, the invention may be employed to view several monitors and associated IR emitters, without interference between different synchronization signals from the different monitors.

The invention will not undesirably "blind" the viewer when the viewer turns away from the synchronization signal emitter. Instead, in the absence of a remotely generated synchronization signal, the invention will continue to drive the liquid crystal cells in the viewer's eyewear in synchronization with an oscillator within the eyewear, in either a "shutter" mode (in which each cell is alternately driven into occluded and transmissive states) or a "bright" (non-occluding) mode in which each cell is driven by a low-voltage square wave signal into a transmissive state. Furthermore, regardless of the mode into which the eyewear will automatically default in the absence of a remotely generated synchronization signal, the user may manually switch the eyewear at any time between such a shutter mode (for stereoscopic viewing) and such non-occluding mode (for viewing a non-stereoscopic image).

BRIEF DESCRIPTION OF THE DRAWINGS

FIG. 7 is a side view of the eyewear of the inventive system, which has one of the inventive liquid crystal shutter assemblies mounted in each of its lens sockets.

FIG. 8 is a top view of the eyewear shown in FIG. 7.

DESCRIPTION OF THE PREFERRED EMBODIMENTS

Figure 1:
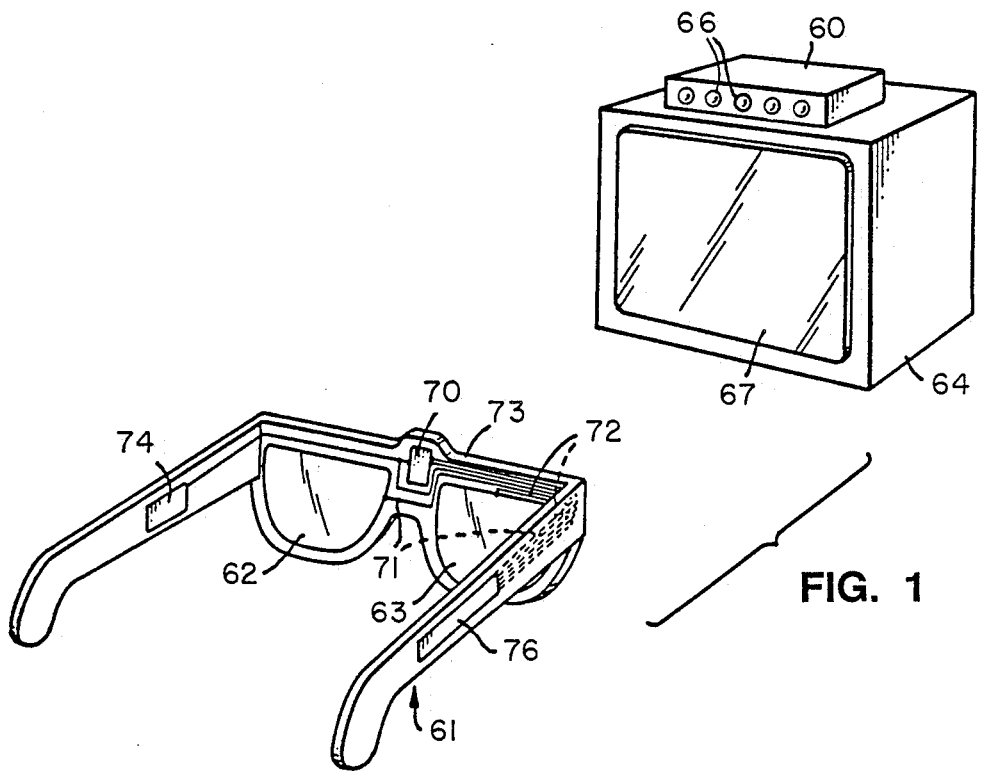
FIG. 1 is a perspective view of a liquid crystal shutter system embodying the invention.

A first preferred embodiment of the invention will be described with reference to FIG. 1. In FIG. 1, infrared transmitter 60 (with IR diodes 66) and electronic display unit 64 receive synchronization information from an external video source. Electronic display 64 also receives video information needed to display a field-sequential image. The synchronization information or sync pulses cause IR transmitter 60 to supply power to diodes 66, in order to broadcast a synchronization signal representing the field rate and phase of the fields comprising the field-sequential image. The synchronization signal is received by a receiver mounted on eyewear 61. The receiver includes IR sensor 70 and associated circuitry to be described below. The field-sequential image is displayed on screen 67 of display unit 64, and then reaches liquid crystal shutter assemblies 62 and 63, which are mounted in the lens sockets of eyewear 61.

The occlusion of each of active electro-optical assemblies 62 and 63 is synchronized with the field rate of the image displayed by electronic display unit 64, because the video source (not shown) supplies to display unit 64 the same synchronization information it supplies to transmitter 60 (for transmission to assemblies 62 and 63). Transmitter 60 is preferably an infrared transmitter because the proliferation of infrared technology in the field of home electronics has resulted in its relative perfection as a form of wireless signalling, but it may alternatively be another wireless means, such as a radio or ultrasound transmitter. In other alternative embodiments, receiver sensor 70 is omitted and the synchronization signal is instead transmitted directly from transmitter 60 to drive circuit 76 through a wire transmission line (not shown in FIG. 1).

The selection device for the stereoscopic electronic display system of FIG. 1 is pair 61 of eyewear including liquid crystal shutter assemblies 62 and 63. Each of shutter assemblies 62 and 63 is preferably driven by a carrier-less voltage signal whose net time-averaged voltage is substantially zero (such as the signals to be described below with reference to FIGS. 3 and 4). Shutter assemblies 62 and 63 are identical. In most embodiments in which eyewear 61 receives a stereoscopic image, the shutter assemblies 62 and 63 are driven substantially 180 degrees out of phase by the drive signals.

Figure 2:
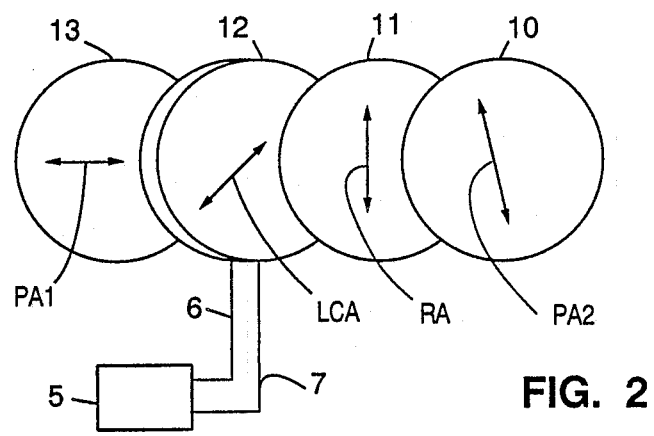
FIG. 2 is a simplified, exploded view of the optical components of the FIG. 1 system.

A preferred embodiment of either one of identical elements 62 and 63 will be described next with reference to FIG. 2. In the shutter system shown in FIG. 2, components 10, 11, 12, and 13 are mounted closely together within a lens socket of eyewear 61. Polarizer 13 is a linear polarizer having a horizontally oriented absorption axis PA1. Unpolarized light propagates from the display screen (not shown in FIG. 2) through polarizer 13 to components 10, 11, and 12.

Component 10 is a linear polarizer having absorption axis PA2. Component 12 is a surface mode liquid crystal cell having an alignment axis LCA, oriented at 45 degrees to the vertical, and component 11 is a quarter-wave retarder having a slow axis RA. Cell 12 will preferably be of the surface mode type described in above-referenced U.S. Pat. No. 4,385,806, and the axes PA1, RA, LCA, and PA2 will preferably be oriented as in the achromatic shutter described in above-referenced U.S. patent application Ser. No. 267,699, both of which disclosures are incorporated herein by reference.

Driver 5 supplies driving voltage signals to the conductive layers of cell 12 via lines 6 and 7. The preferred waveform and magnitude of the driving voltage signal will be described below, with reference to FIGS. 3 and 4. If the driving signals for cell 12 (in one of elements 62 and 63) are substantially 180 degrees out of phase with respect to the driving signals for cell 12 (not shown) in the other of elements 62 and 63, one of elements 62 and 63 will be transmissive when the other is occluded, and vice versa. Each of assemblies 62 and 63 functions as a shutter, and the system of FIG. 1 thus includes two shutter systems.

In variations on the FIG. 1 system (and the shutter shown in FIG. 2) polarizer 13 is not a linear polarizer. For example, polarizer 13 may be a circular polarizer, in which case the other components of the assemblies 62 and 63 should be modified, and the axes of the components optimally oriented, for use with circularly rather than linearly polarized light transmitted to them through polarizer 13 (as taught for example, in referenced U.S. patent application Ser. No. 267,699).

The FIG. 1 system includes an IR link, including IR transmitter 60 at display unit 64, and IR receiver 70 in the frame of eyewear 61. Receiver 70 receives IR sync information broadcast by transmitter 60 and uses this sync information to synchronize the drive signals supplied from drive circuit module 76 via electric lines 71 and 72 to shutter elements 62 and 63, so that elements 62 and 63 switch in synchronization with the displayed image field rate. With the preferred carrier-less driving signals (to be described below) driving the shutter elements 62 and 63, there is a vast reduction in power required for driving the shutter elements. Such a reduction of power is of critical importance, since it is important to be able to use small, light-weight batteries and to be able to run the eyewear for a long period of time without the need to replace or recharge batteries. In the FIG. 1 embodiment, a small battery 74 serves as the power supply for shutter elements 62 and 63 and IR receiver sensor 70, and a simple, compact drive circuit is housed in a small module 76 incorporated within the frame of eyewear 61. Alternatively, battery 74 or drive circuit module 76, or both, may be housed in a small pack (not shown) the size of a credit card mounted adjacent the eyewear, such as in a shirt pocket of the viewer.

The drive signals supplied to shutters 62 and 63 are generated in drive circuit module 76 in the frame of eyewear 61. Module 76 is connected via lines 71 and 72 to shutter elements 62 and 63, respectively, and via line 73 to receiver 70.

An important advantage of the FIG. 1 system is that it does not require large liquid crystal panels (which are extremely expensive to manufacture) for switching the polarization of polarized light at field rate. We have recognized that the largest single cost factor in conventional stereoscopic electronic display systems is the cost of the large liquid crystal panels. In conventional systems, the high cost of large liquid crystal panels had been tolerated because the large liquid crystal panels allowed an observer to use passive glasses including sheet polarizers, which had ergonomic superiority compared to conventional active visors or glasses.

In contrast, in FIG. 1, a small liquid crystal cell is mounted in each lens socket of light-weight wireless eyewear 61. The liquid crystal cells are driven (out of phase, in most embodiments of the invention) by carrier-less signals, enabling a substantial reduction in the price of a stereoscopic display system with no impairment of performance. Such price reduction occurs primarily because the liquid crystal cells in the inventive system, since they are mounted at the viewer's eyes, may be very small and inexpensive.

Figure 3:
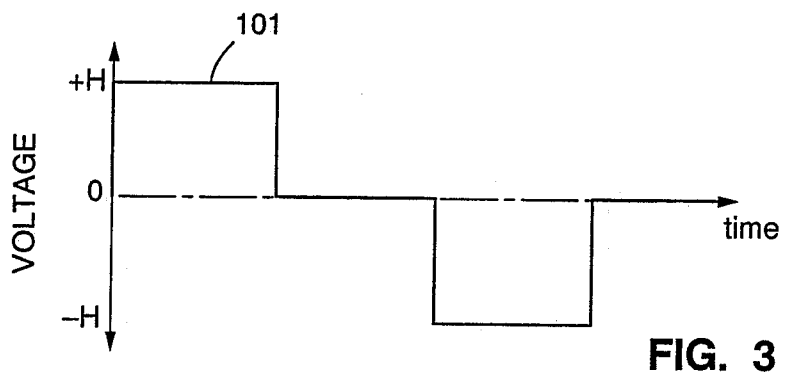
FIG. 3 is a graph of the waveform of a preferred carrier-less signal for driving the liquid crystal cell of the inventive system.
Figure 4:
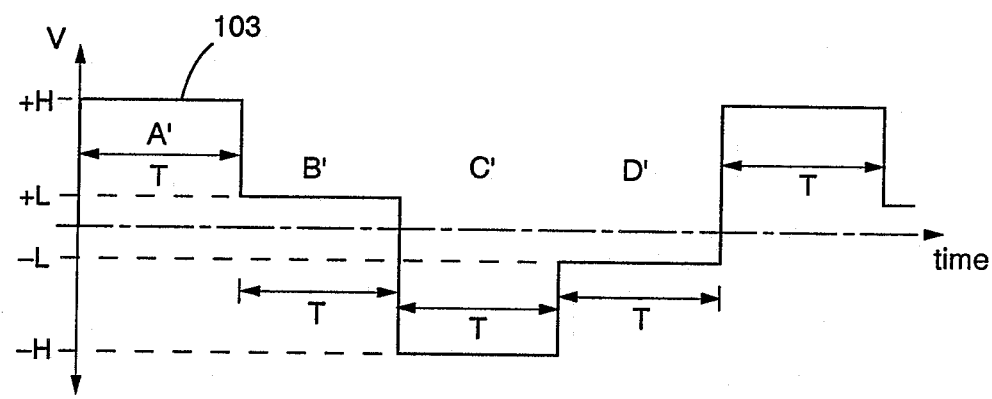
FIG. 4 is a graph of the waveform of another preferred carrier-less signal for driving the liquid crystal cell of the inventive system.
Figure 6:
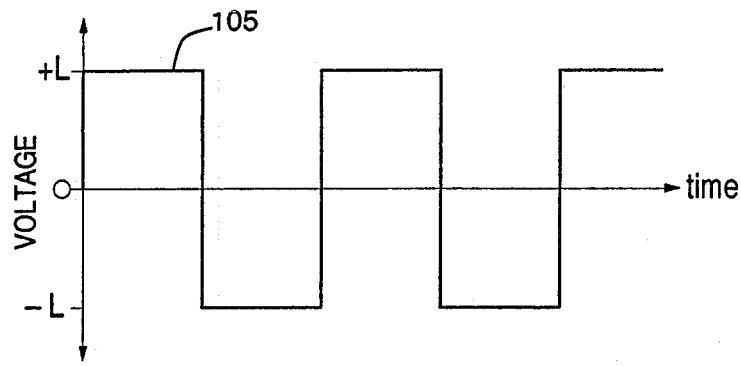
FIG. 6 is a graph of the waveform of yet another preferred carrier-less signal for driving the liquid crystal cell of the inventive system in the non-occluding state.

Each of FIGS. 3, 4, and 6 shows a carrier-less driving signal waveform which has been found to be useful for driving the inventive shutter. Each carrier-less wave in FIGS. 3 and 4 has zero time-averaged net voltage, and has alternating high potential portions (with voltage equal to $+H$ or $-H$), and low potential portions (with voltage equal to $+L$ or $-L$, where the absolute magnitude of L is less than the absolute magnitude of H. In waveform 101 of FIG. 3, the high potential portions, above and below ground respectively, have equal absolute magnitude and the low potential portions are at zero voltage. In waveform 103 of FIG. 4, high potential portions A' and C' have equal absolute magnitude, but are above and below ground respectively, and low potential portions B' and D' have equal absolute magnitude, B' being above ground and D' being below ground.

Figure 5:
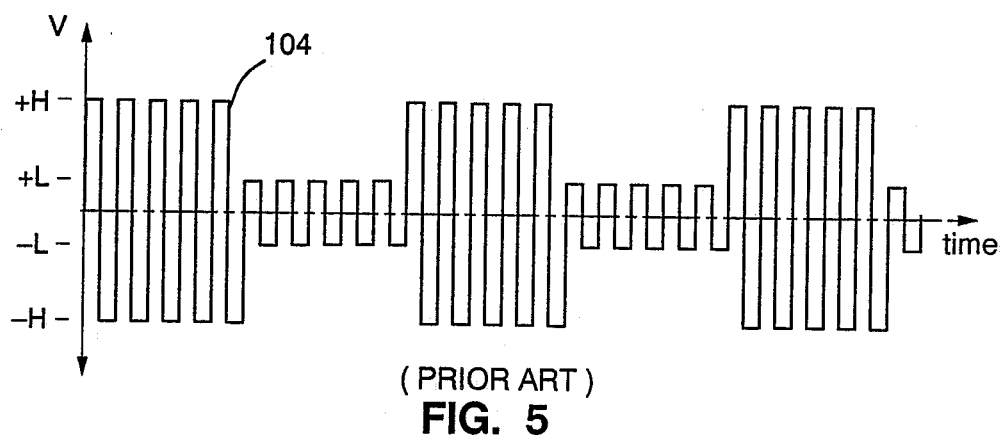
FIG. 5 is a graph of the waveform of a conventional modulated carrier signal for driving a liquid crystal cell.

Waveform 104 of FIG. 5 is an alternative driving signal waveform that may be used to drive each cell of the inventive shutter. Waveform 104 is a square wave modulated AC carrier wave, with alternating high voltage and low voltage portions.

We prefer to employ carrier-less driving signals having any of waveforms 101 and 103 (or variations thereof) rather than a modulated AC carrier driving signal having waveform such as 104. An important advantage to using such a carrier-less driving signal is that a simpler, more compact, and less costly driver circuit may be employed and far less power is required to operate the cell. The reduction in power needed to drive the cell is truly substantial, better than an order of magnitude. This reduced power requirement has an important application in the inventive embodiment described with reference to FIG. 1.

Any of the signals shown in FIGS. 3 and 4 will alternately "open" the shutter (i.e., render the shutter transmissive) and occlude the shutter. Each of these signals will open the shutter when the high potential portions are applied to the shutter's liquid crystal cell, and will occlude the shutter when the low potential portions are applied to the liquid crystal cell. However, at times during operation of the inventive system, it may be desirable to keep the shutter open continuously (without occlusion). For example, if the viewer looks away from monitor 64 in order to read printed material (or to view a non-stereo monitor) it is desirable for the shutter associated with each eye of the viewer to remain open.

In order to maintain the shutter open continuously, the shutter should be driven with a low voltage square wave drive signal such as signal 105 in FIG. 6. Signal 105 consists of alternating high potential portions (at a voltage equal to $+L$ or $-L$), but has no high potential portions as do signals 101, 103, and 104. For as long as square-wave signal 105 is applied to the shutter, the shutter will remain open continuously.

Typical values for the low potential L are in the range from about 4 volts to about 6 volts, for driving a liquid crystal cell including liquid crystal material having a birefringence of 0.135 and having a cell spacing of seven microns.

Preferably, the inventive system includes a drive circuit capable of operating in either of two modes: a first mode (sometimes referred to herein as the "Bright" mode) producing both a low-voltage square wave signal (such as signal 105); and a second mode (sometimes referred to herein as the "Shutter" mode) producing a drive signal (such as signal 101, 103, and 104) for alternately occluding and opening the shutter. A preferred embodiment of the invention includes a means for switching the drive circuit from the second mode to the first mode. Thus, when a viewer decides to read printed matter, or to observe a non-stereoscopic monitor, he or she may manually select the non-occluding mode for higher brightness.

Eyewear assembly 200 shown in FIGS. 7 and 8 includes a manual switching means (switch 206) for switching between the first and second modes described in the previous paragraph. Eyewear assembly 200 also includes manual "Off/on" switch 204, manual "Stereo" switch 220, and manual "Pseudo-Stereo" switch 222, as shown in FIG. 8. Frame 201 of assembly 200 defines two lens sockets in which liquid crystal shutter assemblies 202 and 203 are mounted. Infrared receiver sensor 208 is provided for sensing a synchronization signal broadcast from a remote transmitter. Sensor 208 is mounted in a bevelled, recessed portion of frame 201 so that it is capable of receiving only radiation that is incident from the narrow angular range between rays 214. Preferably, the recessed portion of frame 201 is shaped so as to restrict only the horizontal range of sensor 208, and not the vertical range. Drive circuit 205 is mounted inside frame 201, and is accordingly shown in phantom view. In response to a first manual actuation of switch 204, drive circuit 205 will commence to generate drive signals, and in response to the next manual actuation of the switch will stop circuit 205 from generating drive signals. Each manual actuation of mode switch 206 will cause drive circuit 205 to switch between the first mode and the second mode described in the previous paragraph.

It will be apparent (given the Figures, and their description provided below) to one of ordinary skill in the art of electrical drive circuit design how to construct a circuit capable of producing a drive signal having any of the waveforms 101, 103, 104, or 105 (or any of numerous variations thereon) for driving one of the inventive shutters. It will also be apparent (given the Figures, and their description provided below) to one of ordinary skill in the art of electrical drive circuit design how to construct a circuit capable of producing two drive signals (having any of the waveform types 101, 103, or 104, or variations thereon), each for driving one of two of the inventive shutters (for example, for driving the shutters 180 degrees out of phase with respect to each other).

Preferably, the synchronization signals are encoded in accordance with a pulse width modulation scheme, before they are transmitted from transmitter 60 to receiver sensor 70. This encoding scheme, unlike conventional schemes (such as carrier-frequency encoding) employed in most home appliance remote controllers has the following advantages: it allows rapid decoding of the encoded signal (i.e., where a video signal is displayed, the encoded synchronization signal may be decoded during the vertical retrace time of the video signal); it allows the encoded signal to have short duration (allowing the transmitter to generate high power encoded pulses for a given number of emitter diodes); and it allows use of low power decoding circuitry within the receiver.

Preferably, the decoding circuitry is automatically gated from a standby (or "Sleep") mode which consumes little power, to an operating mode (which consumes more power) in response to detection of a start pulse. Both the encoding and decoding circuitry preferably include quartz crystal clocks (having, for example, a frequency of 32.768 KHz) for extremely precise operation.

The preferred pulse width modulation scheme employs only a "start" pulse and an "L/R" pulse for encoding each bit of synchronization information (no address pulses are employed). Each "L/R" pulse identifies the corresponding image field as one to be selectively transmitted to the viewer's left eye or to the viewer's right eye. The left eye code and the right eye code are pulses having distinguishable width.

For example, in a preferred embodiment to be discussed below with reference to FIGS. 9 and 10, both the transmitter and receiver are clocked by 32.768 KHz crystal clock signals (having a clock period of 30.5 microseconds), the left eye pulse ("L" pulse) width is four clock cycles (122 microseconds), and the right eye pulse ("R" pulse) width is two clock cycles (61 microseconds).

Figure 9A:
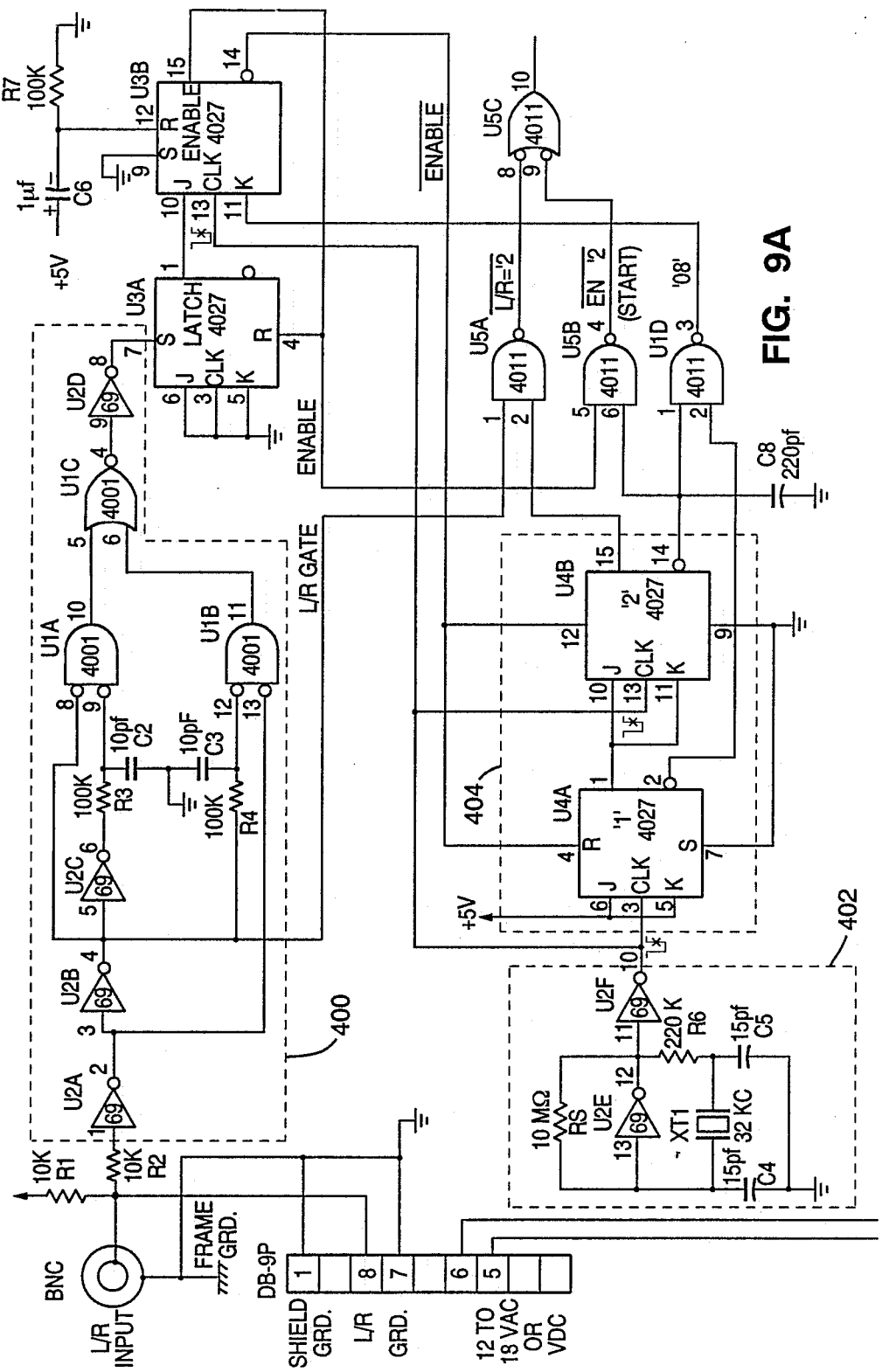
FIG. 9 is a circuit diagram of a preferred embodiment of the synchronization signal transmitter of the inventive system.
Figure 9B:
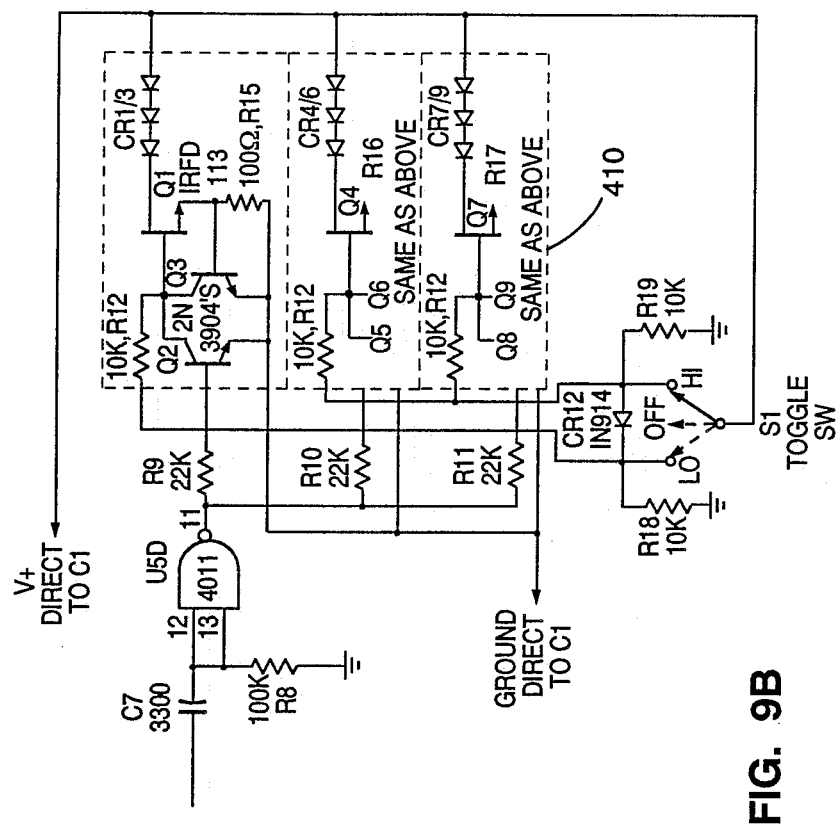
Figure 9C:
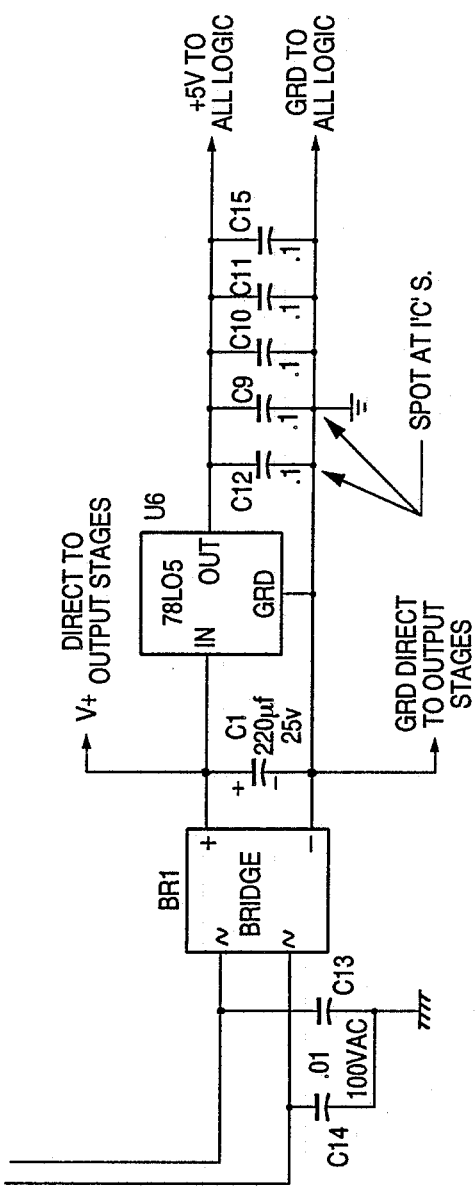
Figures 10, 11:
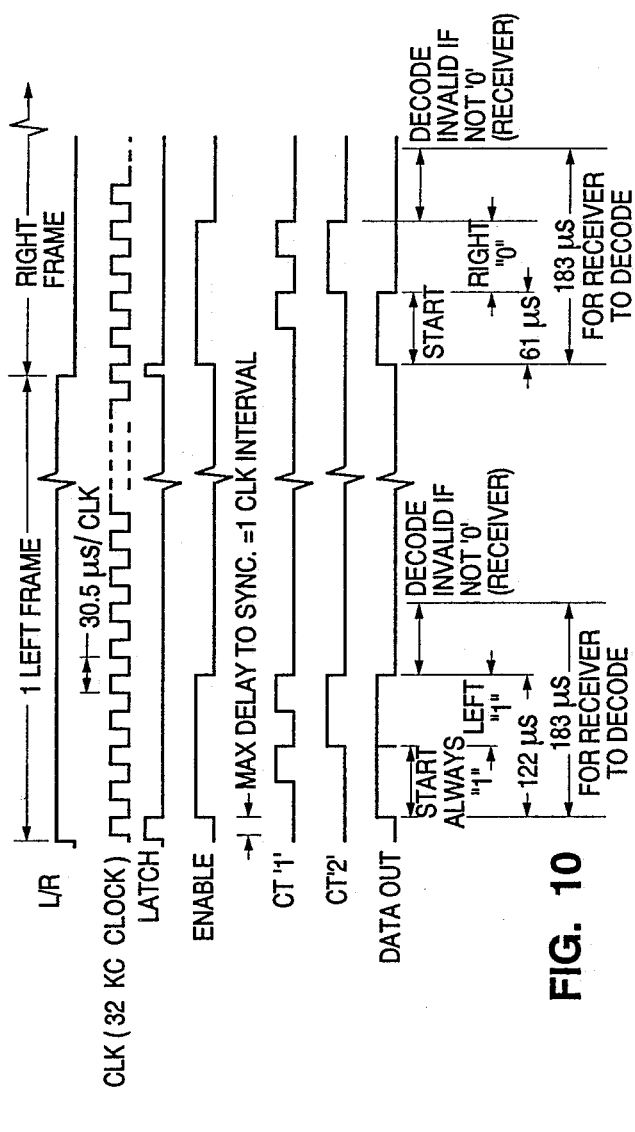
FIG. 10 is a timing diagram for the FIG. 9 circuit.
FIG. 11 is a block diagram of a preferred embodiment of the synchronization signal receiver of the inventive system.
Figure 12A:
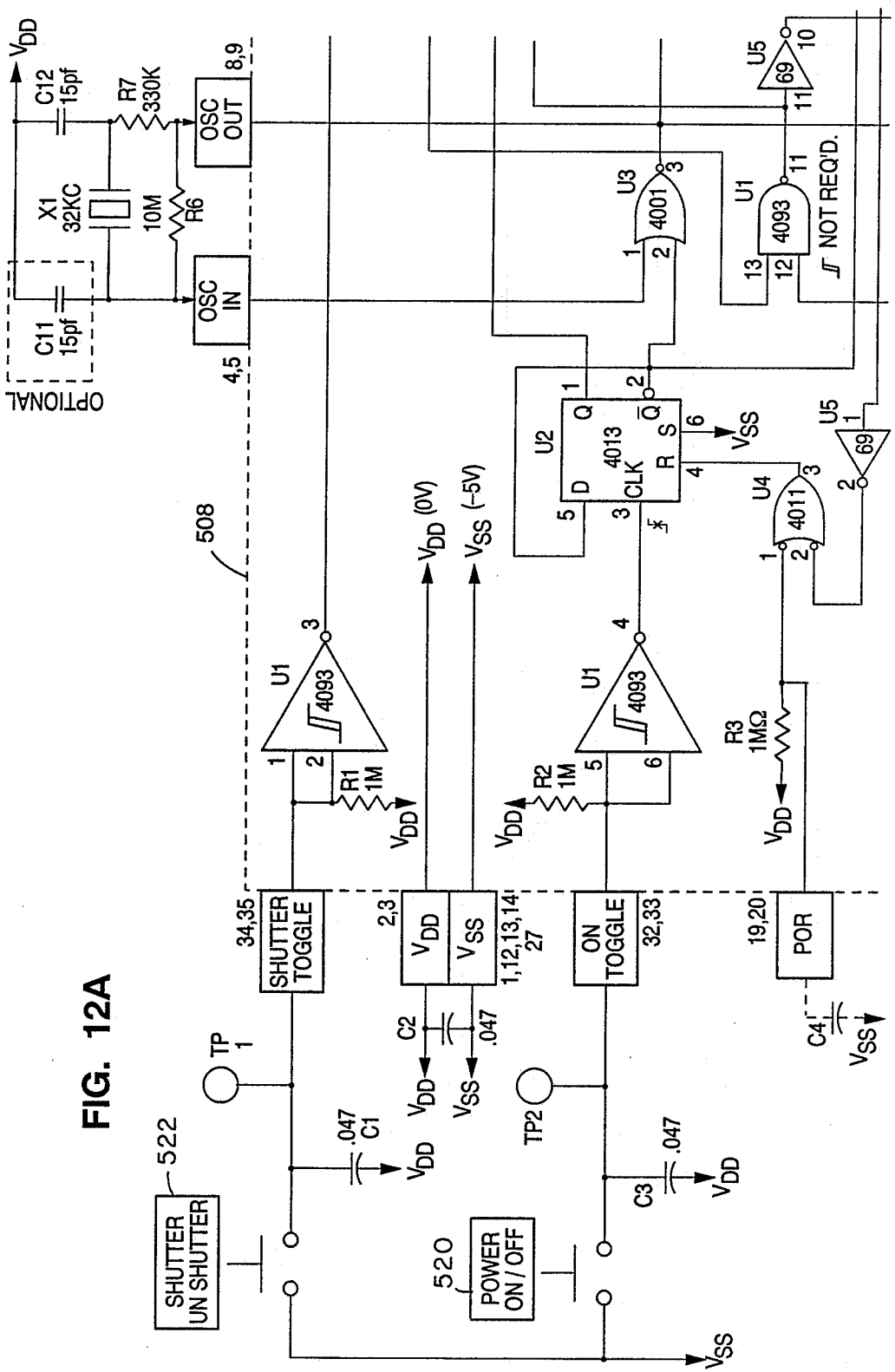
FIG. 12 is a circuit diagram of a preferred embodiment of the synchronization signal receiver of the inventive system.
Figure 12B:
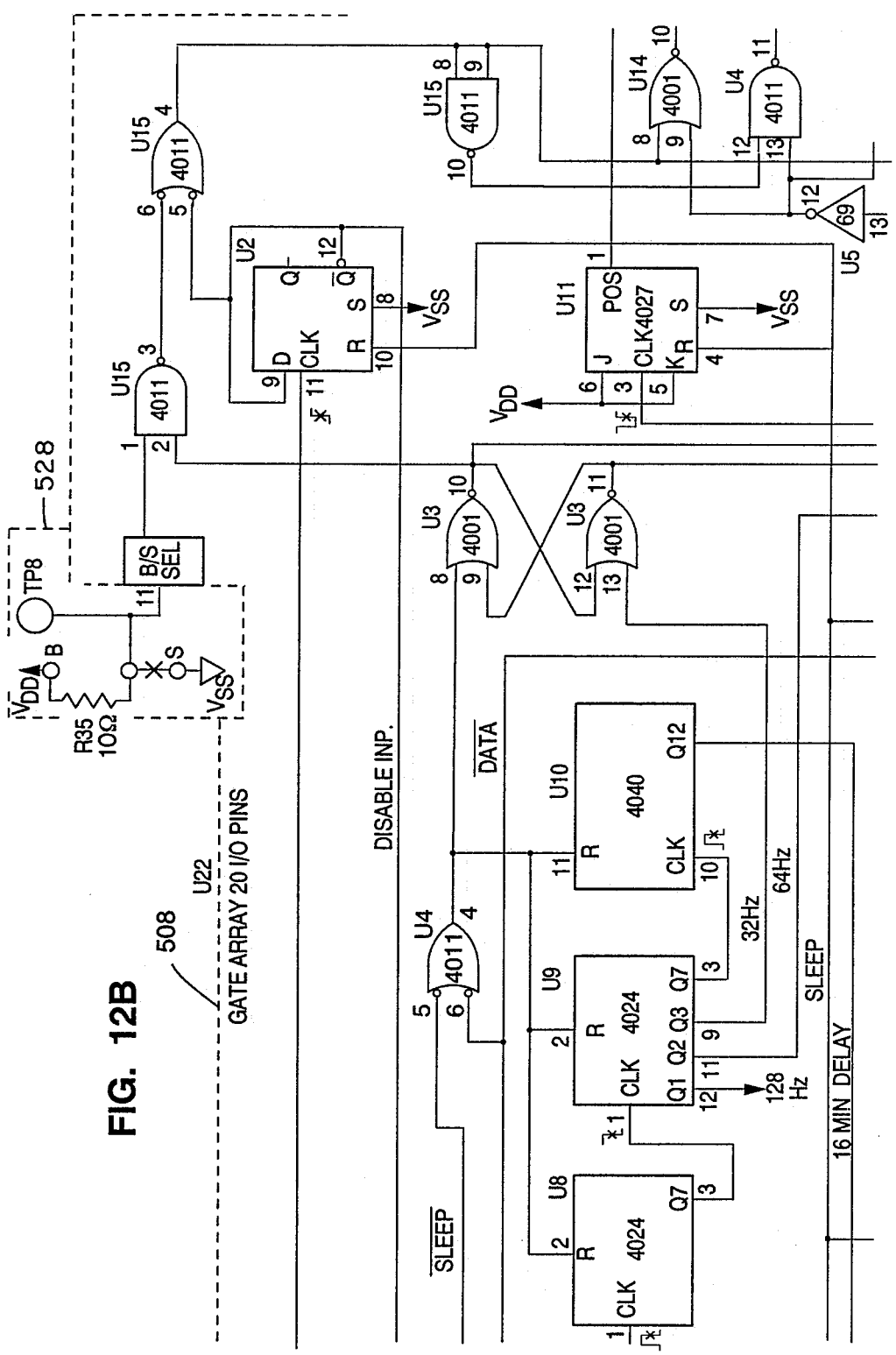
Figure 12C:
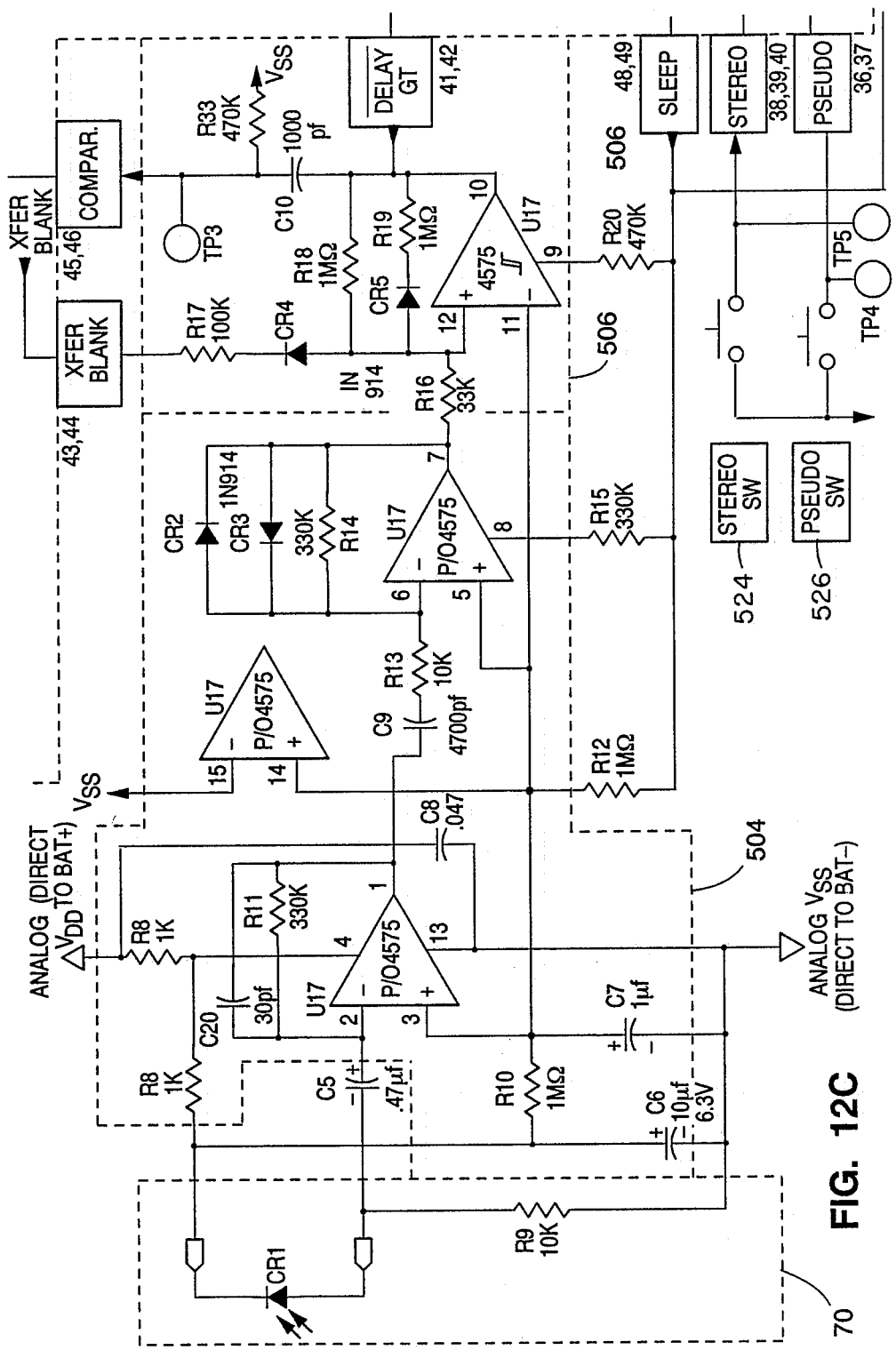
Figure 12D:
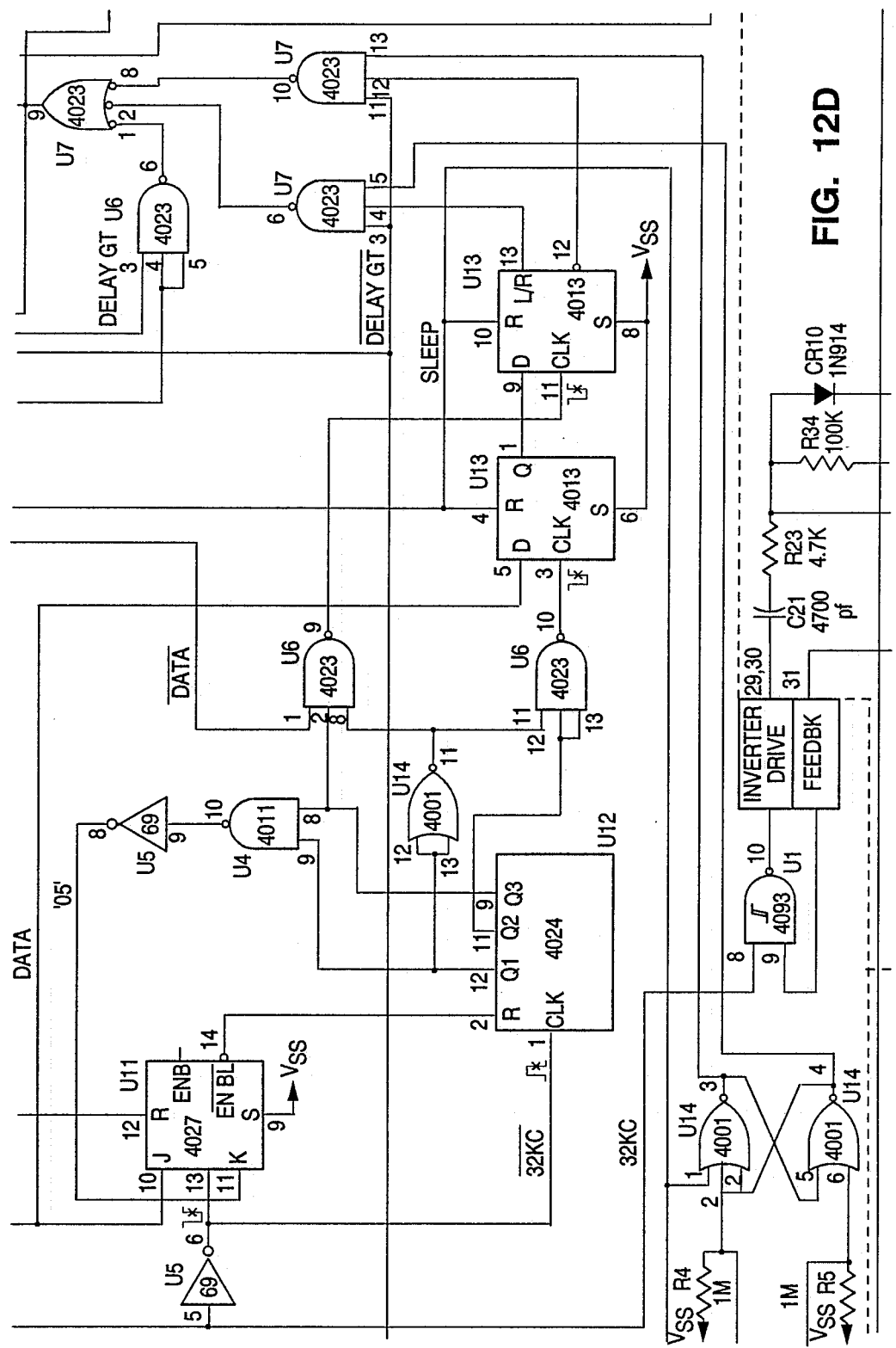
Figure 12E:
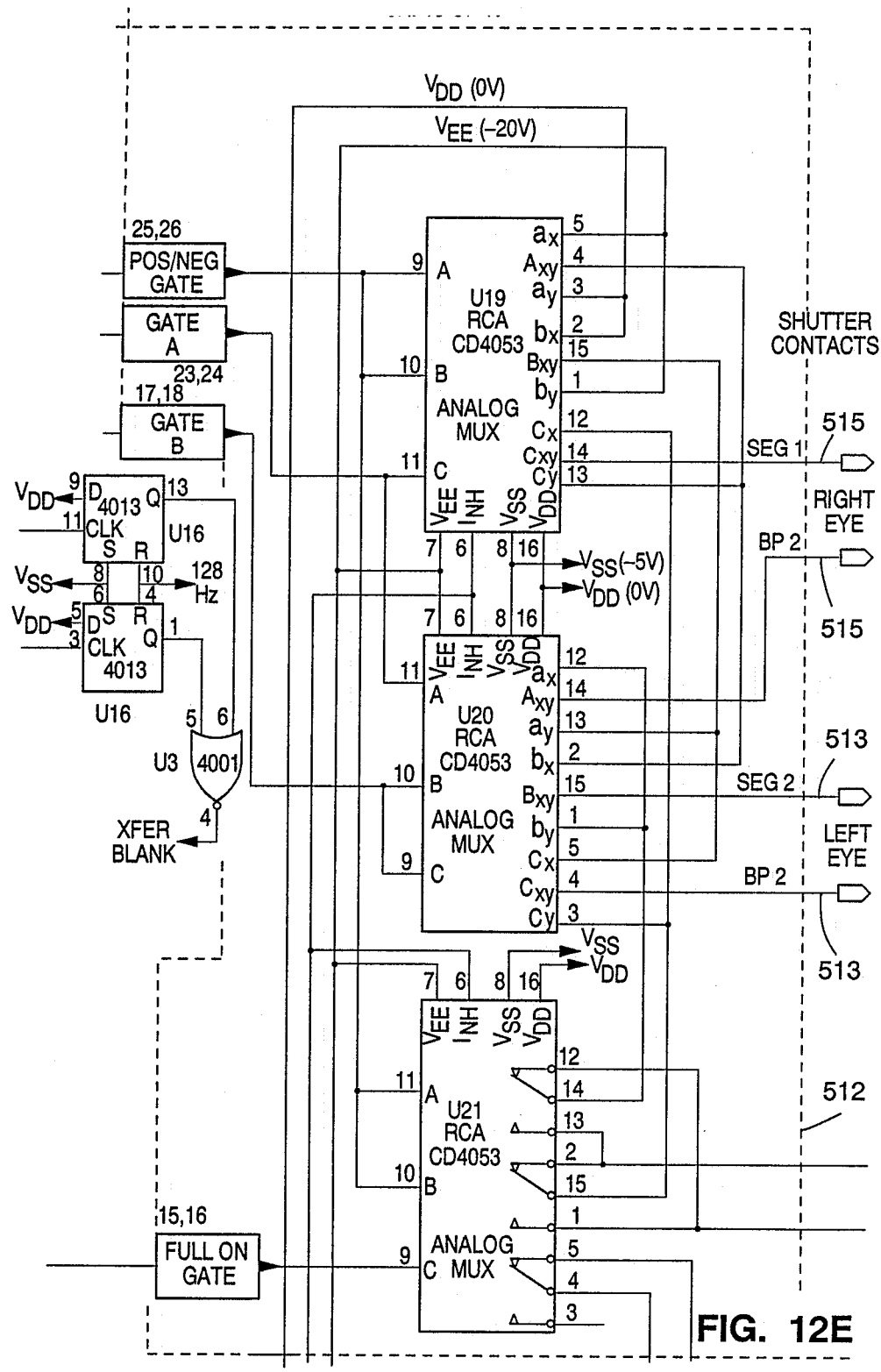
Figure 12F:
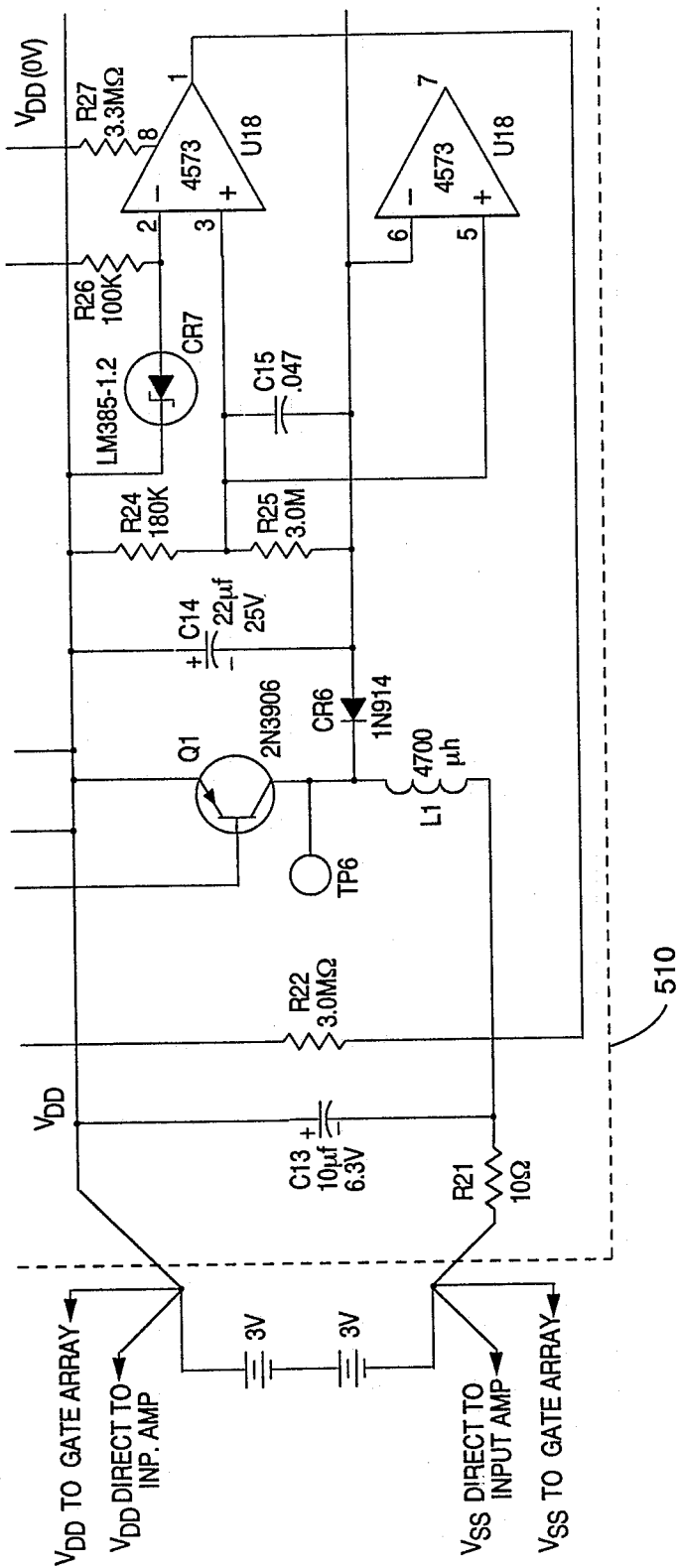
Figure 12G:
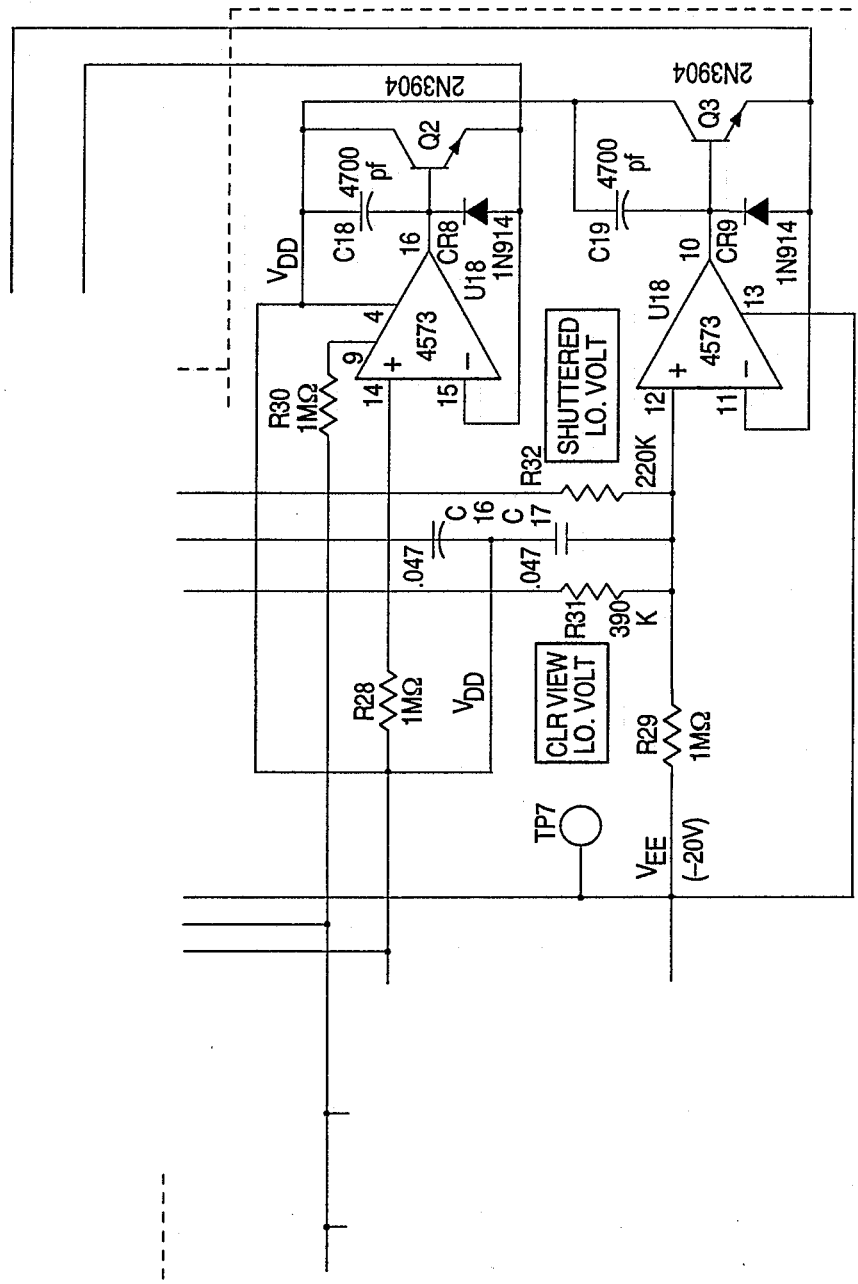

One suitable embodiment of transmitter 66 is shown in the circuit diagram set forth as FIG. 9, and the corresponding timing diagram set forth as FIG. 10.

The left eye/right eye level signal (input signal "L/R"), a sequence of transition marking pulses, enters the transmitter circuit through either a conventional BNC connector (as shown) or a multi-pin panel connector. Signal L/R is passed through transition detector circuit 400 comprising inverters U2A, U2B, and U2C, AND gates U1A and U1B, NOR gate U1C, and inverter U2D. The transition marking pulses emerging from circuit 400 (the signal asserted at the output of inverter U2D) set latch U3A. Latch 3A and flip/flop U3B together comprise a synchronizing circuit which starts a left or right eye signal at the next internally generated pulse of clock signal "CLK." The CLK signal is generated in oscillator circuit 402, which includes a 32.768 KHz crystal oscillator and inverters U2E and U2F.

As shown in FIG. 10, clock signal CLK supplied from circuit 402 to flip/flop U3B has a frequency of 32.768 KHz, and thus has a period of 30.5 microseconds. Thus, after a synchronization delay of not more than 30.5 microseconds, circuit U3B (in FIG. 9) asserts an ENABLE pulse having a duration of four clock periods. Divider circuit 404 comprising flip/flops U4A and U4B also receives the CLK signal from circuit 402. Circuit 404 asserts a clock signal having half the frequency of signal CLK, when enabled by the inverse of the ENABLE signal. The output of divider circuit 404 is decoded by NAND gate U5A (having one input terminal connected to output terminal 15 of flip/flop U4B and another input terminal which receives the L/R signal) and NAND gate U5B (having one input terminal connected to output terminal 14 of flip/flop U4B and another input terminal which receives the ENABLE signal). One inverting input terminal of AND gate U1D is connected to output terminal 14 of flip/flop U4B, and the other inverting input terminal of AND gate U1D is connected to output terminal 2 of flip/flop U4A.

The first two counts (the first 61 seconds) of the output signal of flip/flop U4B are gated through NAND gate U5B to form the "START" pulse (radiation representing a binary "one") which is always emitted during the first 61 microseconds of the DATA OUT signal. The next two counts (the next 61 seconds) asserted at the output terminals of flip/flop U4B are gated through NAND gate U5A when the L/R signal is high (so that the DATA OUT signal represents a binary "one" during these two counts for a left eye signal, and a binary "zero" during these two counts for a right eye signal. No radiation (representing a binary "zero") is emitted during the final two counts (61 microseconds) of the DATA OUT signal. AND gate U1D decodes the final counts, in order to terminate the ENABLE gate and hence the decoding sequence.

The outputs of NAND gates U5A and U5B are connected to the inverting inputs of OR gate U5C, so that a pulse width modulated signal (representing left and right eye pulses) is asserted at the output of circuit U5C. The pulse width modulated signal asserted at the output of circuit U5C is coupled through capacitor C7 to inverter U5D. AC coupling through capacitor C7 is employed to eliminate the possibility of burning out the radiation emitting diodes or loading down the power supply if the crystal oscillator is slow in turning on during the application of power to the circuit. The output of inverter U5D is supplied to infrared-emitting diode circuitry 410 to cause the infrared-emitting diodes therein to emit binary radiation signals (DATA OUT), each having a duration of 183 microseconds and having one of the two DATA OUT waveforms shown in FIG. 10. Circuitry 410 includes a number of identical current-regulated power amplifiers, each connected between the output of inverter U5D and a set of series-connected, infrared-emitting diodes.

Each power amplifier includes two NPN transistors (i.e., Q2 and Q3) and one power MOSFET (i.e., Q1). Transistor Q2 gates MOSFET Q1 on, and Q3 forms a feedback regulator, which allows the voltage across resistor R15 to rise to approximately 0.7 volts. The current through each string of radiation-emitting diodes is thus approximately (0.7 volts)/R15. The number of series-connected diodes in each string is limited only by the available voltage and the breakdown voltage of the power MOSFET.

If the left eye is to be open (i.e., left liquid crystal shutter 62 is to be transmissive) then the diodes will emit radiation (representing a binary "one") during the middle 61 microseconds of the DATA OUT signal, and if the right eye is to be open (i.e., right liquid crystal shutter 63 is to be transmissive) then the diodes will emit no radiation (representing a binary "zero") during the middle 61 microseconds of the DATA OUT signal.

By controlling the position of switch S1 (shown in FIG. 9), the user may vary the power of the radiated signal between "High" and "Low" settings in order to control the system's radial transmission range. The Low power setting provides a transmission range of about five feet, which may be desirable to reduce reflections of the synchronization signal from walls in a small room. The High power setting connects additional radiating diodes to the transmission circuit, and thus the provides an increased transmission range of about fifteen feet. The increased transmission range may be desirable if a large number of viewers will simultaneously view the monitor.

The FIG. 9 transmitter, together with the receiver circuit for decoding the radiation transmitted from the FIG. 9 transmitter, will preferably have response time (the period between presentation of the L/R pulse at the transmitter, and response by the receiver to the encoded L/R pulse) of not more than 244 microseconds (including a crystal clock sync delay of up to 30.5 microseconds in the transmitter, a crystal clock sync delay of up to 30.5 microseconds in the receiver, and a receiver decoding and validation period of 183 microseconds.

A commercially available MTD 7030 infrared detector diode is suitable for use as receiver sensor 70 of the inventive system. With an MTD 7030 sensor, the minimum radiant power density incident at the receiver for reliable reception is about 10 microwatts per square centimeter (which corresponds to about 100 nanoamps of current in the receiver diode). The peak spectral response of the receiver is between 900 and 1050 nanometers. The IR-emitting diodes employed in this embodiment of the invention preferably have a peak emission wavelength of 940 nanometers and are pulsed on at a current of 1.0 amperes. An IR diode is used rather than an IR transistor because of the required response speed of sensor 70, in the preferred embodiment. In slower systems, an IR photo transistor could alternatively be employed as sensor 70.

A preferred embodiment of the receiver circuitry for processing the output of sensor 70 will next be described with reference to FIGS. 11 and 12. FIG. 11 is a block diagram of the receiver circuitry shown in more detail in FIG. 12 (and the FIGS. 11 and 12 have consistent reference numerals).

Radiation sensor 70 is coupled through capacitor C5 to amplifier circuitry 504. Amplifier circuitry 504 is a high gain current to voltage converter, whose output is supplied to threshold comparator circuitry 506. The amplified, thresholded, pulse width modulated data from circuitry 506 is supplied to gate array 508 for decoding. Thus, circuitry 504 and 506 together reproduce the waveform of the transmitter voltage signal (DATA OUT), for subsequent decoding to extract the Left (L) and Right (R) eye synchronization information therefrom. Circuitry 504 and 506 is designed to block interference signals generated by high voltage generator 510 and lens driver circuitry 512.

Gate array 508 is clocked at the same rate as is the transmitter, and is designed to interpret incoming signals as an L pulse upon detection of a 1 bit in the second 61 microsecond slot (and as an R pulse upon detection of a 0 bit in the second 61 microsecond slot), but only if the circuitry detects a 0 bit in the third 61 microsecond time slot. Otherwise (if a 1 bit is detected in the third 61 microsecond time slot), the receiver should reject the incoming encoded radiation signal (and should not decode it as either an L or an R pulse). In this way, extraneous noise pulses having too long a duration will not be decoded as L pulses. Both types of incoming signals (the left and right eye signals) require 183 microseconds for decoding. The receiver circuitry should also reject pulses having width of less than one clock period (30.5 microseconds), so that narrow noise spikes will not be decoded as R pulses.

The receiver circuit may be configured to default automatically into either a "Shutter" mode or a "Bright" mode, each clocked by internal crystal clock X1 rather than the synchronization pulses received from the transmitter, in the absence of the synchronization signal from transmitter 60 (i.e., if the transmitted IR signal drops below the detection level). Specifically, a counter which is normally reset by valid active signals is allowed to count for two frames (rather than one frame) of a receiver clock rate approximately equal to the transmitter frame rate, 120 Hz. This results in a 16 millisecond period of no input signal. After the counting period, a change-over latch is set in order to supply signals (clocked by the receiver's internal crystal clock) to lens driver 512. If switch 528 is configured in the "Shutter" position, the signals supplied to lens driver 512 will cause driver 512, in turn, to send driving signals to the left and right liquid crystal shutters on lines 513 and 515, respectively, for alternately shuttering the liquid crystal shutters at the receiver oscillator frame rate (128 Hz), rather than a rate determined by a remotely generated synchronization signal.

If Bright/Shutter mode switch 528 is set in the "Bright" position, the receiver will default to a "Bright" mode (described above) to cause lens driver 512 to send "Bright" mode driving signals (low-voltage square wave signals) to the left and right liquid crystal shutters on lines 513 and 515, respectively, if the transmitted IR signal drops below the detection level. Regardless of the position of switch 528, consecutive activations of Bright/Shutter mode switch 522 (corresponding to switch 206 in FIGS. 7 and 8) will toggle the receiver between the Bright and Shutter modes. Off/on switch 520 (corresponding to switch 204 in FIGS. 7 and 8) may be consecutively pressed to toggle the lens driver system between operating and "off" states.

In a variation on the FIG. 12 circuit, the receiver circuitry includes means for "hot starting" the left and right liquid crystal cells, by supplying high voltage square wave driving signals to both cells during a brief warm up period immediately after the system is switched "on." The peak to peak voltage of such high voltage driving signals should be the same as the maximum peak to peak voltage of the driving signals in the Shutter mode. During the warm up period, which will typically last from less than one second to several seconds, the liquid crystal cells will warm up rapidly, so that the system may be operated in the "Bright" mode immediately after the warm up period, without the user experiencing mottling (or other visual distortions) that may result when driving "cold" liquid crystal cells in the "Bright" mode.

Gate array 508 is operable in a "Stereo" mode (in which the Left synchronization pulses cause the left eye shutter to be driven, and the Right synchronization pulses cause the right eye shutter to be driven) and a "Pseudo-Stereo" mode (in which the Left synchronization pulses cause the right eye shutter to be driven, and the Right synchronization pulses cause the left eye shutter to be driven). This is accomplished by operating "Stereo" switch 524 and "Pseudo-stereo" switch 526 (which correspond, respectively, to switches 220 and 222 in FIG. 8).

High voltage generating circuitry 510 is a charge on demand inductor fly back system. The 32 KHz inductor drive waveform (from gate array 508) is dated on and off as required by the current demand of lens drive system 512 The feedback signal asserted by circuitry 510 at the "Feedback" pin (pin 31) of gate array 508 controls the oscillator gating.

Figure 13:
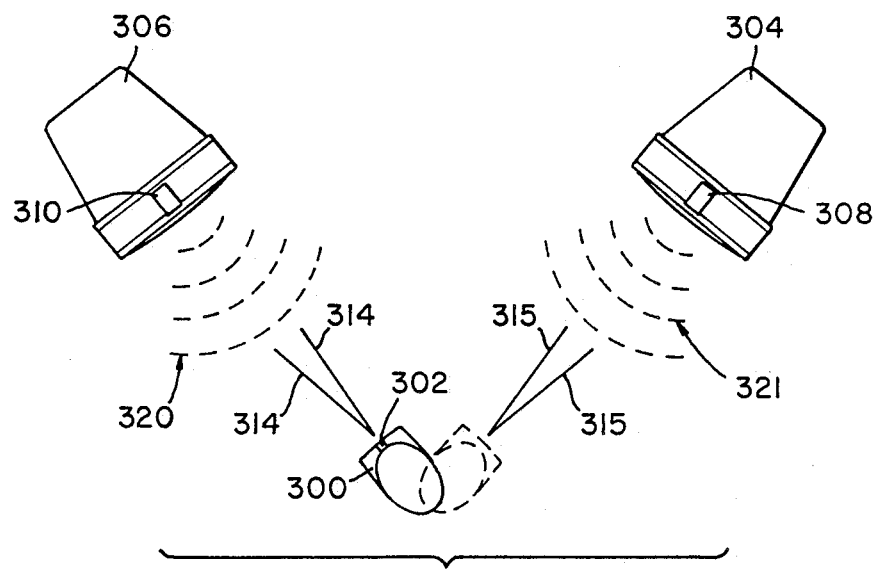
FIG. 13 is a top view of a preferred embodiment of the inventive liquid crystal shutter system.

Lens drive system 512 includes a series of bilateral switches which, under the control of gate array 508, switch in the appropriate voltages to generate the liquid crystal cell drive waveforms (such as those shown in FIGS. 4, 5, and 6). In the preferred embodiment shown in FIG. 12, these bilateral switches are embodied in three RCA CD4053 analog multiplexer circuits connected as shown. Lines 513 supply the driving voltage signal from system 512 to the left liquid crystal cell assembly, and lines 515 supply the driving voltage signal from system 512 to the right liquid crystal cell assembly FIG. 13 illustrates how the invention may be employed to view field-sequential images from two or more different monitors, which in general will display images with different field rates and phase. Transmitter 308, mounted on monitor 304, broadcasts a first synchronization signal 320 over a wide angular range (or "cone of view"). Transmitter 310, mounted on monitor 306, broadcasts a second synchronization signal 321 over a wide angular range (cone of view). Although the angular range of transmitters 308 and 310 is shown to be less than hemispherical in FIG. 13, in some applications it is preferable that the angular range of each transmitter be substantially hemispherical.

Liquid crystal cells comprising a portion of the inventive distributed shutter assembly are mounted in the lens sockets of eyewear 300. Synchronization signal receiver 302 is also mounted on eyewear 300. The angular range of synchronization signal receiver 302 is sufficiently narrow that receiver 302 will be sensitive to only one synchronization signal at a time. Thus when the viewer faces monitor 306 (as shown), the angular range of receiver 302 is bounded by rays 314, and eyewear 300 will be driven in response to synchronization signal 320 from transmitter 310. When the viewer turns his or her head so that receiver 302 faces toward monitor 304, the angular range of receiver 302 is bounded by rays 315, and eyewear 300 will be driven in response to the synchronization signal from transmitter 308. Thus, the invention may be employed to view several monitors sequentially, without interference between different synchronization signals from the different monitors.

Transmitters 308 and 310 should have a wide angular range so that the viewer may receive the transmitted synchronization signals from a wide variety of locations. Preferably, when several monitors will be operated simultaneously, the transmitters in each will be switched into their "Low" power mode (discussed above with reference to FIG. 9) to reduce the radial transmission range of each in order to reduce the risk that spurious synchronization signals (from more than one monitor) will confuse the drive circuitry within eyewear 300. Preferably, the angular reception range of receiver 302 is limited by recessing the receiver within an optical aperture in the frame of eyewear 300.

The above description is merely illustrative of the invention. Various changes in the details of the materials, designs and methods described may be within the scope of the appended claims.

What is claimed is:

1. A liquid crystal shutter system for selecting fields of a field-sequential image, including:
    a liquid crystal cell assembly, for selectively transmitting fields of the field-sequential image in response to a drive signal;
    a means for transmitting a pulse width encoded synchronization signal from a remote location to the liquid crystal cell assembly;
    a receiver mounted adjacent the liquid crystal cell assembly for receiving the synchronization signal; and
    a drive circuit electrically coupled to the liquid crystal cell assembly and the receiver, for generating the drive signal in response to the synchronization signal and supplying the drive signal to the liquid crystal cell assembly.

2. The system of claim 1, wherein the transmitter is selectively operable in a low power mode in which the transmitter broadcasts a short range synchronization signal, and in a high power mode in which the transmitter broadcasts a long range synchronization signal.

3. The system of claim 1, wherein the drive circuit is selectively operable in a first mode in which the drive signal has low amplitude portions alternating with high amplitude portions, and in a second mode in which the drive signal is a square wave.

4. The system of claim 1, wherein the drive circuit operates in a first mode in the presence of the synchronization signal, and in a second mode in the absence of the synchronization signal, wherein the drive signal has low amplitude portions alternating with high amplitude portions in the first mode, and wherein the drive signal is a square wave in the second mode.

5. The system of claim 4, wherein the field-sequential image is a stereoscopic image having left fields alternating with right fields.

6. The system of claim 1, wherein the pulse width encoded synchronization signal comprises frames of information, wherein each frame includes a start bit, and thereafter an information bit, and thereafter a confirmation bit.

7. The system of claim 6, wherein the start bit, the information bit, and the confirmation bit are binary signals having substantially equal duration, the start bit has a first polarity, and the confirmation bit has a second polarity opposite the first polarity.

8. The system of claim 1, wherein the synchronization signal is a radiation signal, the transmitting means broadcasts the radiation signal over a wide angular range, and the receiver receives radiation within a narrow angular range.

9. The system of claim 8, wherein the radiation signal is an infrared radiation signal.

10. The system of claim 8, also including an eyeglass frame having a recessed portion, wherein the liquid crystal cell assembly and the drive circuit are mounted in the frame, and the receiver is mounted in the recessed portion of the frame.

11. The system of claim 1, wherein the drive signal is a carrier-less signal having time-averaged amplitude substantially equal to zero.

12. The system of claim 11, wherein the drive signal has low amplitude portions alternating with high amplitude portions.

13. The system of claim 11, wherein the drive signal is a square wave.

14. A liquid crystal shutter system for selecting alternating ones of the fields of a field-sequential image, wherein the fields of the field-sequential image occur at a field rate, including:
a transmitter for broadcasting a pulse width encoded synchronization signal characterizing the field-sequential image;
a frame positioned away from the transmitter;
a liquid crystal cell assembly mounted in the frame for selectively transmitting fields of the image in response to a drive signal, wherein the drive signal has a component with a frequency substantially equal to the field rate;
a receiver mounted on the frame for receiving the synchronization signal; and
a drive circuit mounted on the frame and electrically coupled to the liquid crystal cell assembly and the receiver, for generating the drive signal in response to the synchronization signal and supplying the drive signal to the liquid crystal cell assembly.

15. The system of claim 14, wherein the receiver is mounted in a recessed portion of the frame so that the receiver has a narrow angular range.

16. The system of claim 14, wherein the field-sequential image is a stereoscopic image having left fields alternating with right fields, wherein the liquid crystal cell assembly includes a first liquid crystal cell and a second liquid crystal cell, wherein the drive circuit generates a first drive signal for causing the first liquid crystal cell to transmit the left fields of the image, and wherein the drive circuit generates a second drive signal for causing the second liquid crystal cell to transmit the right fields of the image.

17. The system of claim 16, wherein the first drive signal is a carrier-less signal whose time-averaged magnitude is substantially equal to zero, and the second drive signal is a carrier-less signal substantially 180 degrees out of phase with respect to the first drive signal.

18. The system of claim 16, wherein the frame is an eyeglass frame dimensioned to be worn by an observer of the image, wherein the eyeglass frame has lens sockets, and wherein the first liquid crystal cell and the second liquid crystal cell are mounted in the lens sockets.

19. A liquid crystal cell shutter system, including:
a display assembly, including a means for transmitting a first field-sequential image and a pulse width encoded first synchronization signal characterizing the first field-sequential image;
a liquid crystal cell shutter assembly positioned remotely from the display assembly; and
a drive means electrically connected to the liquid crystal cell shutter assembly for generating a first drive signal in response to the first synchronization signal, wherein the first drive signal is synchronized with the first field-sequential image and the first drive signal causes the liquid crystal cell shutter assembly to select fields of the first field-sequential image, wherein the drive means generates a second drive signal in the absence of any synchronization signal, and wherein the second drive signal causes the liquid crystal cell shutter assembly to remain in a non-occluding state.

20. The system of claim 19, wherein the means for transmitting the first synchronization signal is selectively operable in a low power mode for broadcasting a short range first synchronization signal, and in a high power mode broadcasting a long range first synchronization signal.

21. The system of claim 19, wherein the first drive signal is a carrier-less signal having time-averaged amplitude substantially equal to zero.

22. The system of claim 19, wherein the first drive signal has low amplitude portions alternating with high amplitude portions.

23. The system of claim 19, wherein the second drive signal is a square wave.

24. The system of claim 19, wherein the display assembly also includes a means for transmitting a second field-sequential image and a pulse width encoded second synchronization signal characterizing the second field-sequential image, and wherein the drive means generates a third drive signal in response to the second synchronization signal, wherein the third drive signal is synchronized with the second field-sequential image and the third drive signal causes the liquid crystal cell shutter assembly to select fields of the second field-sequential image.

25. The system of claim 24, also including an eyeglass frame on which the liquid crystal cell shutter assembly and the drive means are mounted, and wherein the drive means includes a receiver with a sufficiently narrow angular range so that the receiver will receive the first synchronization signal, but not the second synchronization signal, when the frame is oriented toward the means for transmitting the first synchronization signal.

26. The system of claim 19, wherein the pulse width encoded first synchronization signal comprises frames of information, wherein each frame includes a start bit, and thereafter an information bit, and thereafter a confirmation bit.

27. The system of claim 26, wherein the start bit, the information bit, and the confirmation bit are binary signals having substantially equal duration, the start bit has a first polarity, and the confirmation bit has a second polarity opposite the first polarity.

* * * * *